No. 675,657. Patented June 4, 1901.
J. C. HOSHOR.
LOADING DEVICE FOR CONVEYERS.
(Application filed Aug. 21, 1900.)
(No Model.)
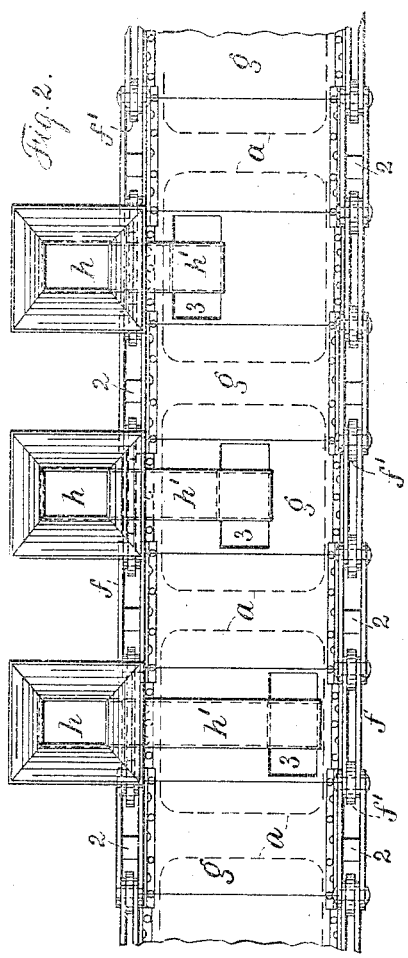
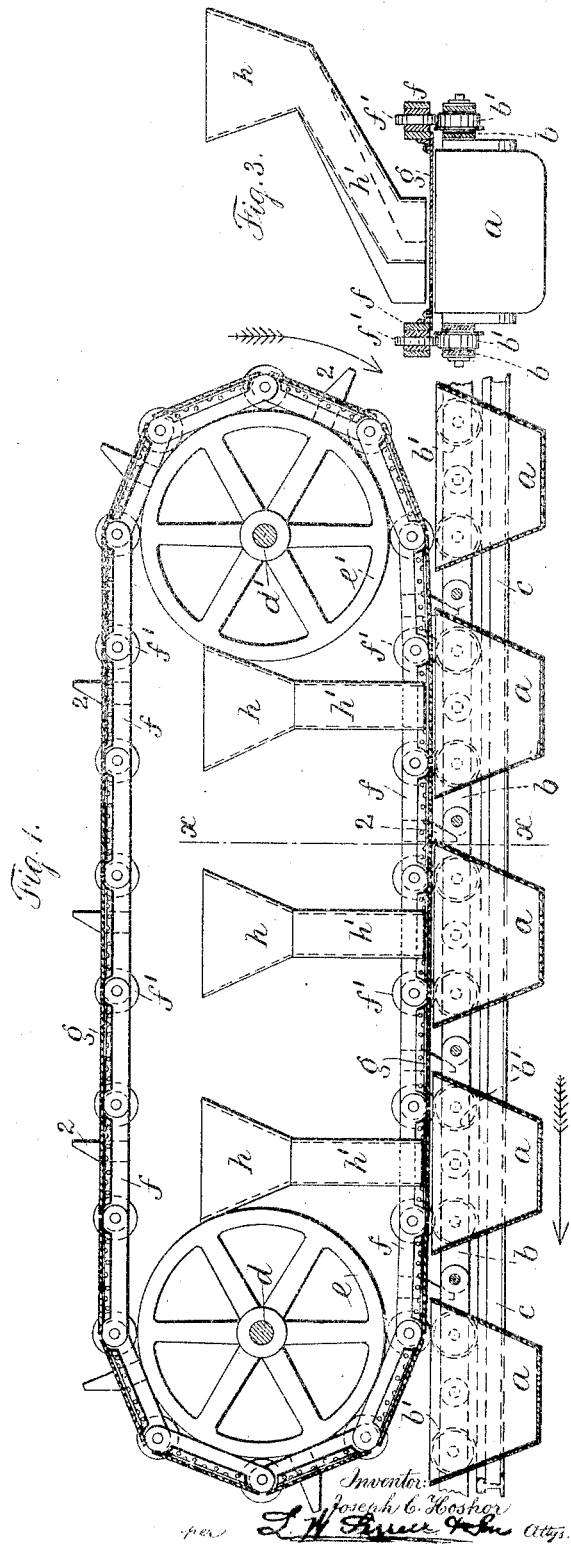

UNITED STATES PATENT OFFICE

JOSEPH C. HOSHOR, OF PATERSON, NEW JERSEY, ASSIGNOR TO HIMSELF AND THOMAS E. PLATT, OF SAME PLACE.

LOADING DEVICE FOR CONVEYERS.

SPECIFICATION forming part of Letters Patent No. 675,657, dated June 4, 1901.

Application filed August 21, 1900. Serial No. 27,563. (No model.)

*To all whom it may concern:*

Be it known that I, JOSEPH C. HOSHOR, a citizen of the United States, residing at Paterson, in the county of Passaic and State of New Jersey, have invented an Improvement in Loading Devices for Conveyers, of which the following is a specification.

Heretofore the buckets of conveyers have been filled progressively from a chute by means of a series of hoppers moving along with the buckets and at the same time covering the intervening spaces between the conveyer-buckets to prevent spilling. It is frequently desirable to progressively deliver different materials at a point of destination, so that the materials mix as delivered, and it is also desirable to regulate or control the proportions or quantities of the different materials; and the object of my present invention is to effect these results.

In carrying out my invention and in combination with a conveyer of gravity-buckets and chains I employ a series or range of covering-plates moving along with the buckets and operated thereby and which covering-plates are provided with openings at different points, and a series of hoppers with projecting chutes are so placed as to come in line with the different openings in the series of plates to deliver material from the hoppers and chutes into different buckets when the openings in the plates coincide with the mouths of the chutes, the materials being cut off as the imperforate plates or portions thereof pass beneath the chutes.

In the drawings, Figure 1 is a longitudinal section and partial elevation illustrating my improvement. Fig. 2 is a partial plan view, and Fig. 3 a partial cross-section and elevation at *x x* of Fig. 1.

The gravity-buckets *a*, the links *b*, forming endless chains, with rollers *b'* between the links of the chain, and the tracks *c* for the same are of any ordinary or well-known construction for the purpose of conveying materials from a place where received or stored to a place of destination.

I provide shafts *d d'* in suitable bearings above the conveyer of buckets and wheels *e e'*, mounted thereon, and endless chains *f*, composed of links, with rollers *f''* between and at the pivots of the links, the said rollers contacting with and bearing upon the rollers *b'* of the conveyer-buckets, the said endless chains surrounding and being supported by the said shafts and wheels *e e'*, and the chains being provided between the links and rollers with plates 2, that project and which come between the links *b'* and contact with the respective ends of the intermediate links *b*, so that by the movement of the conveyer and buckets the endless chains *f* are moved along with the conveyer of buckets and around the wheels *e e'* in the direction of the arrow shown in Fig. 1.

Between the endless chains *f* I place a series of covering-plates *g*, with abutting parallel edges, the ends of said plates being secured to the respective links forming the endless chains *f*, so that said endless chains are connected by said series of plates, which form covering-plates when in their lower position above the gravity-buckets and the spaces between the buckets. As a preferable manner of securing the ends of the plates *g* to the links of the chains *f* I prefer to employ angle-irons, one portion of each of which is riveted to the chains and the other portion of each angle-iron to the plates. This will be apparent, especially by reference to Fig. 3, although I do not limit myself to this form of structure.

Each alternating covering-plate *g* is provided with a rectangular opening 3, and these openings are made in different parts of the plates, the longer portion of the opening being transversely of the plate, and when said openings coincide with adjacent buckets, as shown in Fig. 2, the intermediate covering-plates extend over the openings between the gravity-buckets, and I provide a series of hoppers *h* and chutes *h'* extending therefrom, the hoppers being outside the vertical plane of the endless chains *f*, so that materials may be delivered into the hoppers, and the chutes extend from the hoppers downward and between the upper and lower levels of the covering-plates, the said chutes varying in length and having open ends adapted to come above the rectangular openings in the covering-plates. Figs. 2 and 3 specially illustrate this construction, in which it will be noticed that the right-hand chute of Fig. 2 is the shortest, the left-hand chute the longest, and the intermediate chute of a length between the right and left hand chutes.

In the operation of this device different materials are placed in the respective hoppers and are adapted to move by gravity down the chutes to be delivered into the gravity-buckets through the rectangular openings in the series of plates *g*. The upper surface of these plates travels in close proximity to the mouth of the chute and is adapted to prevent the flow of material from the chute except when one of the rectangular openings comes below the chute, at which time the material flows from the chute through the perforation into the gravity-bucket, and as the series of covering-plates move along the flow of material is cut off until another opening comes beneath the chute. This operation is similar for all the chutes.

It will be apparent from this construction not only that the various gravity-buckets can be filled by different materials, but also that any one bucket is only filled with one material. It is, however, obvious that the openings may be so placed that several successive buckets may be filled from one hopper with the same material or that the different materials from the several hoppers may be delivered alternately and progressively in the gravity-buckets; also, that as the material is delivered at the desired place the various materials follow one another in rotation and mix as delivered, and the proportions of the materials to be delivered may be varied as desired by filling one or more buckets in order with the same material before the following buckets are filled with other material.

My invention is specially useful in connection with blast-furnaces where the same are charged with predetermined quantities of different materials in progression, so that when the furnace is lighted the charge is properly mixed to produce the desired degree of heat and composition for properly fluxing and melting the ore. It is also apparent that the invention is applicable for mixing other materials—such, for instance, as different kinds of coal—or for the mixing of coal and coke or for the mixing of different substances of chemical operations.

I claim as my invention—

1. The combination with a conveyer of gravity-buckets and chains, of a series of covering-plates moving along with the buckets, alternate plates having perforations at different points, and hoppers and chutes for materials to be delivered placed with the mouths of the chutes in line with the various moving openings of the covering-plates, substantially as set forth.

2. The combination with the gravity-buckets, chains, rollers and track forming a conveyer, of endless chains, supports therefor and around which the chains move, a series of plates connected to and extending across between the said chains and covering the gravity-buckets and the spaces between the same, means for moving the said series of covering-plates and their chains with and by the conveyer, there being perforations in alternate plates of the series at different points and hoppers and chutes for receiving materials so placed as to deliver the materials through the openings of the plates into the buckets, the material being cut off in the hoppers by the imperforate portions of the plates, substantially as set forth.

3. The combination with the devices forming a conveyer of gravity-buckets, of devices for feeding different materials to different buckets of the conveyer, devices moving with and by the conveyer, and interposed between the buckets of the conveyer and the devices for delivering material, and adapted to simultaneously deliver different materials into different buckets and to cut off the material from intervening buckets, substantially as set forth.

Signed by me this 16th day of August, 1900.

JOSEPH C. HOSHOR.

Witnesses:
JOHN HULETT,
ALEX THOMSON, Jr.